(12) United States Patent
Lin et al.

(10) Patent No.: US 11,874,708 B2
(45) Date of Patent: Jan. 16, 2024

(54) ELECTRONIC DEVICE

(71) Applicants: Che-Hsien Lin, Taipei (TW); Ko-Yen Lu, Taipei (TW)

(72) Inventors: Che-Hsien Lin, Taipei (TW); Ko-Yen Lu, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 220 days.

(21) Appl. No.: 17/067,773

(22) Filed: Oct. 12, 2020

(65) Prior Publication Data

US 2021/0200278 A1    Jul. 1, 2021

Related U.S. Application Data

(60) Provisional application No. 62/953,908, filed on Dec. 26, 2019.

(51) Int. Cl.
    *G06F 1/16*    (2006.01)

(52) U.S. Cl.
    CPC .................. *G06F 1/1681* (2013.01)

(58) Field of Classification Search
    None
    See application file for complete search history.

(56) References Cited

U.S. PATENT DOCUMENTS

| 9,535,465 B2* | 1/2017 | Bohn | H04M 1/022 |
| 9,891,672 B2* | 2/2018 | Hampton | G06F 1/1681 |
| 10,760,311 B2* | 9/2020 | Regimbal | G06F 1/1681 |
| 2019/0166703 A1* | 5/2019 | Kim | G06F 1/1681 |

FOREIGN PATENT DOCUMENTS

| CN | 203926362 | 11/2014 |
| WO | 2010100843 | 9/2010 |

OTHER PUBLICATIONS

"Office Action of China Counterpart Application", dated Oct. 21, 2021, p. 1-p. 8.

* cited by examiner

*Primary Examiner* — Anthony Q Edwards
*Assistant Examiner* — Rashen E Morrison
(74) *Attorney, Agent, or Firm* — JCIPRNET (57) ABSTRACT

An electronic device includes at least one hinge assembly and two bodies. The hinge assembly includes a main body and two shafts. One end of each of the shafts is pivotally connected to the main body, another end of each of the shafts has an embedded portion, and the embedded portion has a roughened structure thereon. The two bodies correspond to the two shafts respectively, each of the bodies has at least one depression, and the embedded portion of each of the shafts is embedded in the depression of the corresponding body and contacts an inner wall of the depression through the roughened structure.

13 Claims, 11 Drawing Sheets

ELECTRONIC DEVICE

CROSS-REFERENCE TO RELATED APPLICATION

This application claims the priority benefit of U.S. provisional application Ser. No. 62/953,908, filed on Dec. 26, 2019. The entirety of the above-mentioned patent application is hereby incorporated by reference herein and made a part of this specification.

BACKGROUND

Technical Field

The disclosure relates to an electronic device, and more particularly to an electronic device including a hinge assembly.

Description of Related Art

A notebook computer includes two bodies. The two bodies can be opened and closed relative to each other and are pivotally connected to each other by a hinge assembly, and the shaft of the hinge assembly is generally indirectly connected to the body through a bracket. However, the bracket has a certain thickness, so the bracket disposed between the hinge assembly and the body increases the overall thickness of the notebook computer, which goes against the current trend of thin notebook computers. In addition, if a bracket is disposed between the hinge assembly and the body as described above, a large amount of assembly skew accumulates due to the increase in the quantity of elements. Moreover, under the design method, the force applied on the body is transmitted to the shaft through the bracket, and the length of the arm between the force point of the body and the shaft is increased due to the configuration of the bracket, which aggravates the shaking of the body when the force is applied. If the rigidity of the bracket is insufficient, this will cause the body to shake more when the force is applied.

SUMMARY

The disclosure provides an electronic device, in which a bracket is not adapted to be disposed between the shaft and the body.

The electronic device of the disclosure includes at least one hinge assembly and two bodies. The hinge assembly includes a main body and two shafts. One end of each of the shafts is pivotally connected to the main body, another end of each of the shafts has an embedded portion, and the embedded portion has a roughened structure thereon. The two bodies correspond to the two shafts respectively, each of the bodies has at least one depression, and the embedded portion of each of the shafts is embedded in the depression of the corresponding body and contacts an inner wall of the depression through the roughened structure.

In an embodiment of the disclosure, each of the bodies includes a housing, and the depression is formed in the housing.

In an embodiment of the disclosure, the housing has at least one protrusion, and the depression is formed in the protrusion.

In an embodiment of the disclosure, each of the bodies further includes a cover, the cover is assembled to the housing, and opposite ends of the hinge assembly are respectively adjacent and connected to the protrusion and the cover.

In an embodiment of the disclosure, the depression is a non-circular hole, and the embedded portion has a non-circular contour corresponding to the non-circular hole.

In an embodiment of the disclosure, the two shafts are respectively pivotally connected to the main body along two rotating axes parallel to each other, and the embedded portion is embedded in the depression of the corresponding body along a direction parallel to each of the rotating axes.

In an embodiment of the disclosure, the two shafts are respectively pivotally connected to the main body along two rotating axes parallel to each other, the embedded portion has an outer surface extending around the corresponding rotating axis, and the roughened structure is formed on at least part of the outer surface.

In an embodiment of the disclosure, the hinge assembly further includes a linkage structure connected between the two shafts.

In an embodiment of the disclosure, the linkage structure is a gear set.

In an embodiment of the disclosure, the electronic device further includes a transmission wire and a wire sorting structure, the transmission wire is connected between the two bodies, a section of the transmission wire passes through the wire sorting structure, and the wire sorting structure is disposed in the main body of the hinge assembly.

In an embodiment of the disclosure, the wire sorting structure is an elastic body.

In an embodiment of the disclosure, the wire sorting structure includes two assembly parts assembled with each other, and the section of the transmission wire is sandwiched between the two assembly parts.

In an embodiment of the disclosure, the roughened structure is a texture structure.

Based on the above, each of the shafts of the hinge assembly of the disclosure has an embedded portion, and the embedded portion is directly embedded into the depression of the corresponding body to establish the connection between the hinge assembly and each of the bodies. Accordingly, the hinge assembly is indirectly connected to each of the bodies without the bracket, and the overall thickness of the electronic device is reduced without the bracket, and the quantity of elements is therefore decreased to reduce the accumulation of assembly skew. In addition, with the configuration, the force applied on the body is not transmitted to the shaft through the bracket, but is directly transmitted from the body to the shaft, so the length of the arm between the force point of the body and the shaft is small, which reduces the shaking of the body when a force is applied on the body, and the shaking of the body caused by the insufficient rigidity of the bracket is not aggravated when the force is applied on the body. In addition, the embedded portion of each of the shafts has a roughened structure to increase the friction between the embedded portion and the inner wall of the depression, so that the embedded portion is firmly embedded into the depression.

DESCRIPTION OF THE EMBODIMENTS

Figure 1:
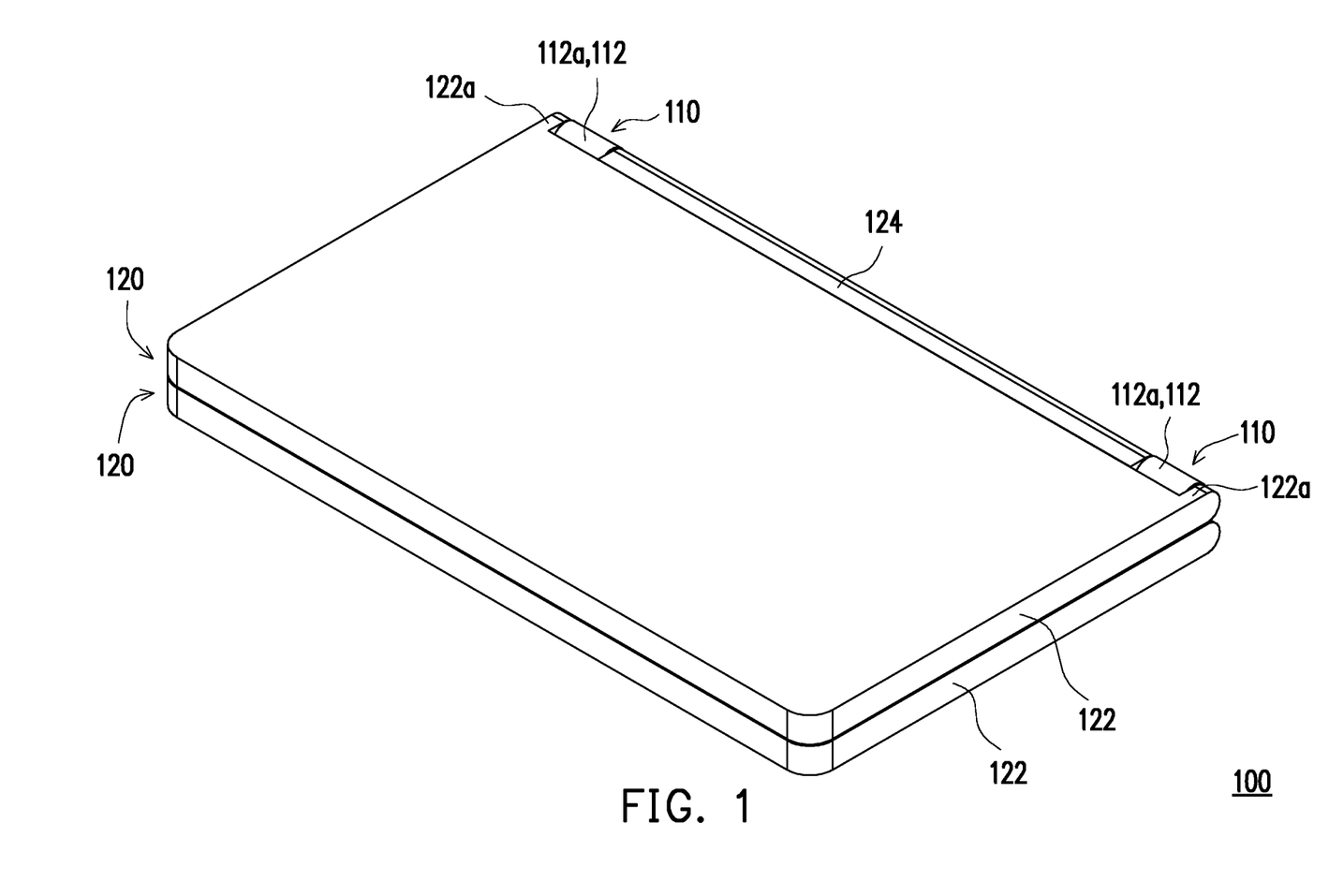
FIG. 1 is a perspective view of an electronic device according to an embodiment of the disclosure.
Figure 2:
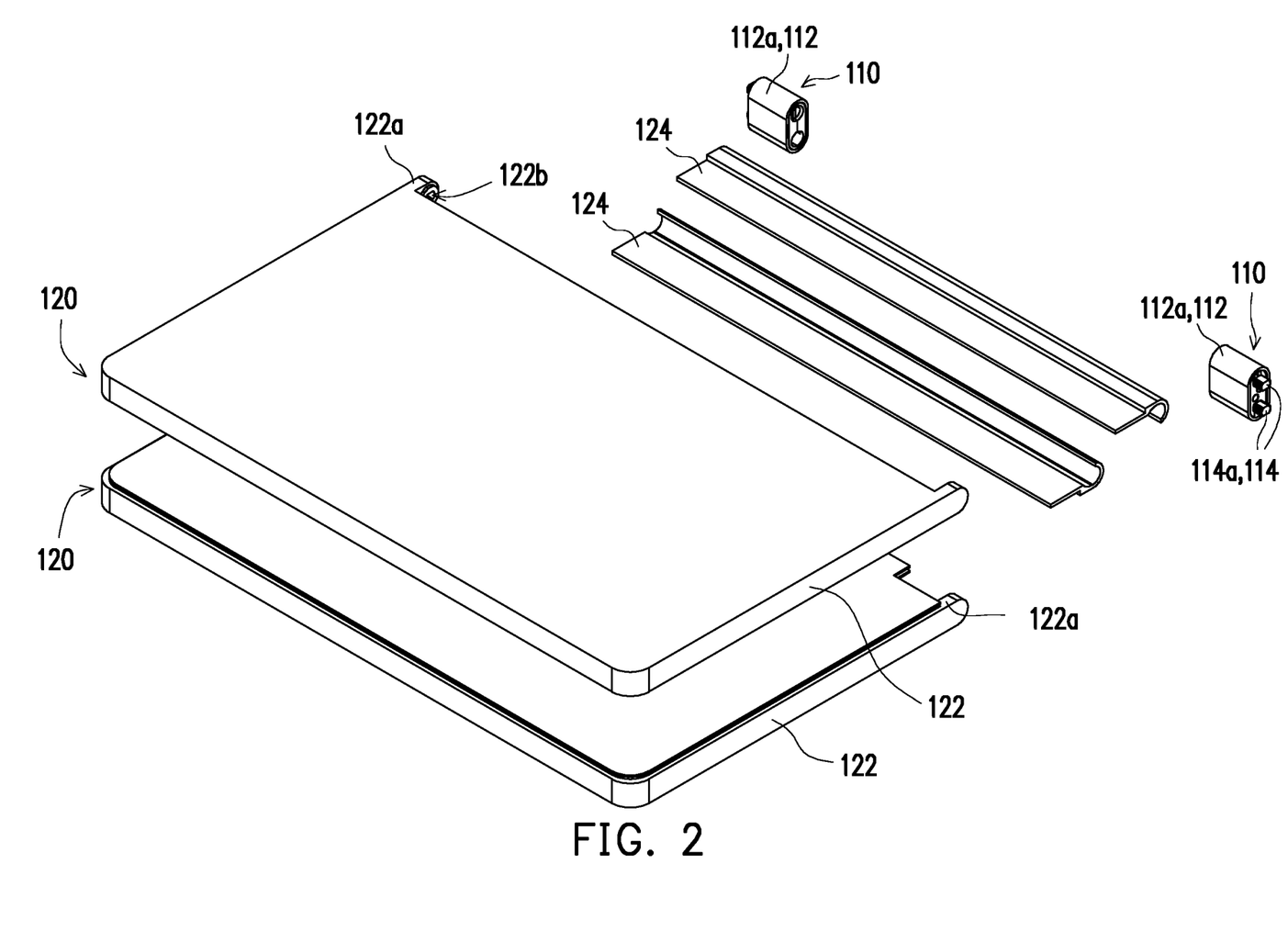
FIG. 2 is an exploded view of the electronic device of FIG. 1.
Figure 3:
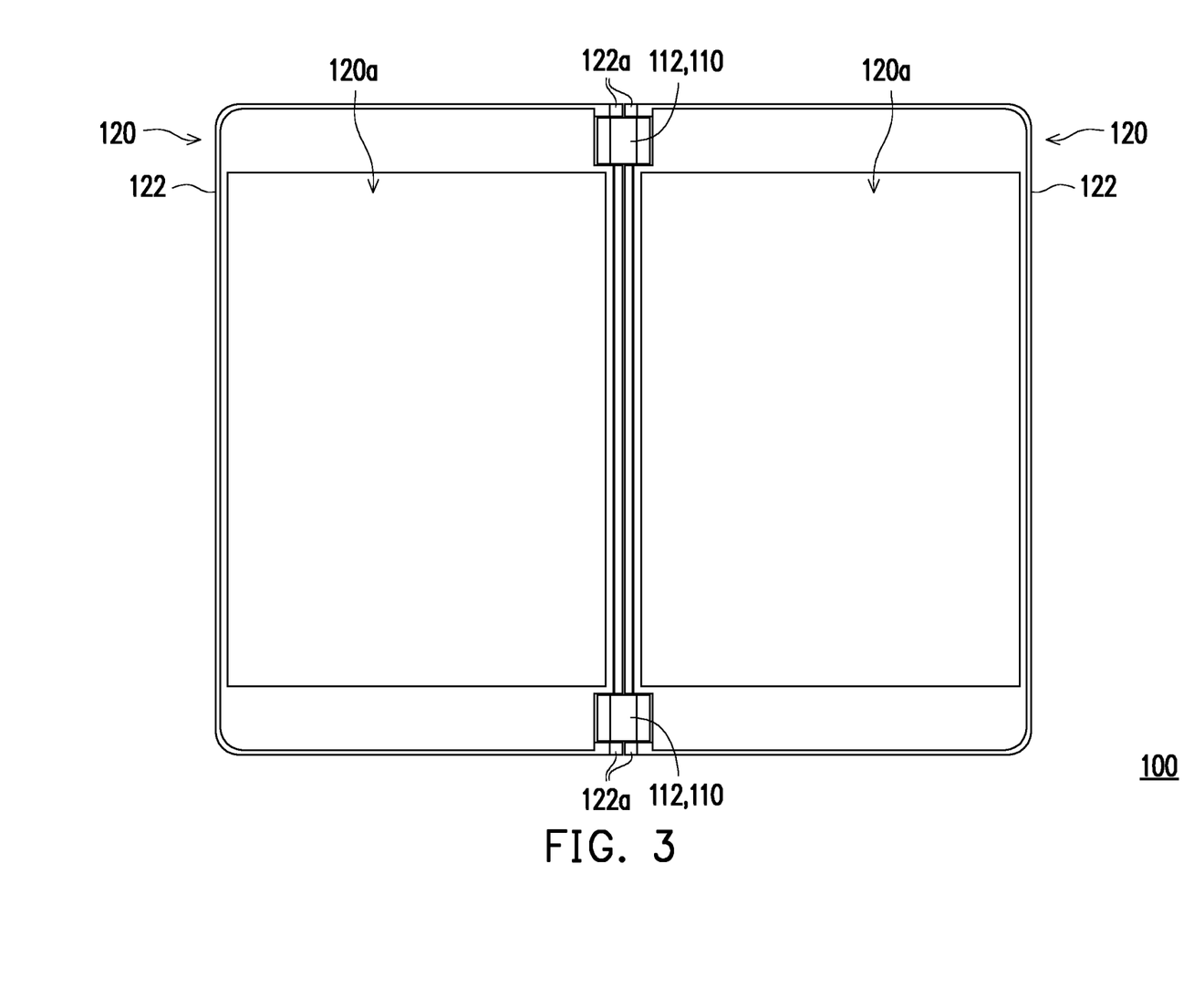
FIG. 3 shows the electronic device of FIG. 1 in an unfolded state.

FIG. 1 is a perspective view of an electronic device according to an embodiment of the disclosure. FIG. 2 is an exploded view of the electronic device of FIG. 1. FIG. 3 shows the electronic device of FIG. 1 in an unfolded state. Referring to FIG. 1 to FIG. 3, an electronic device 100 in the embodiment is, for example, a notebook computer, which includes at least one hinge assembly 110 (two hinge assemblies are shown) and two bodies 120. The two bodies 120 are pivotally connected to each other through the two hinge assemblies 110 and may be rotated relative to each other between a closed state shown in FIG. 1 (the unfolding angle of the two bodies 120 is 0 degrees) and an unfolded state shown in FIG. 3 (the unfolding angle of the two bodies 120 is 180 degrees). In addition, the two bodies 120 may be designed to be able to be rotated relative to each other in a continuous manner from the state shown in FIG. 3 to a reflexed state (the unfolding angle of the two bodies 120 is 360 degrees). The disclosure is not limited thereto.

Figure 4:
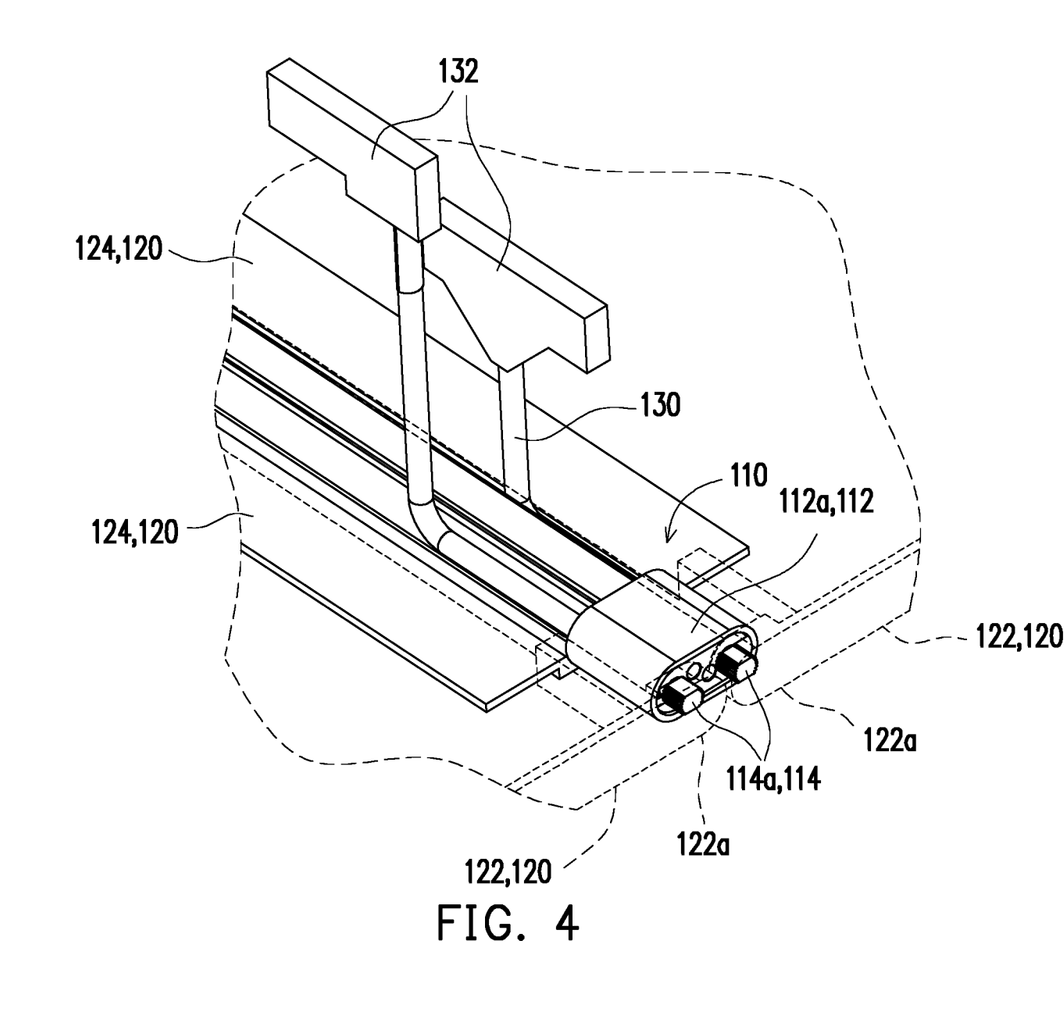
FIG. 4 is a perspective view of part of the electronic device of FIG. 3.
Figure 5:
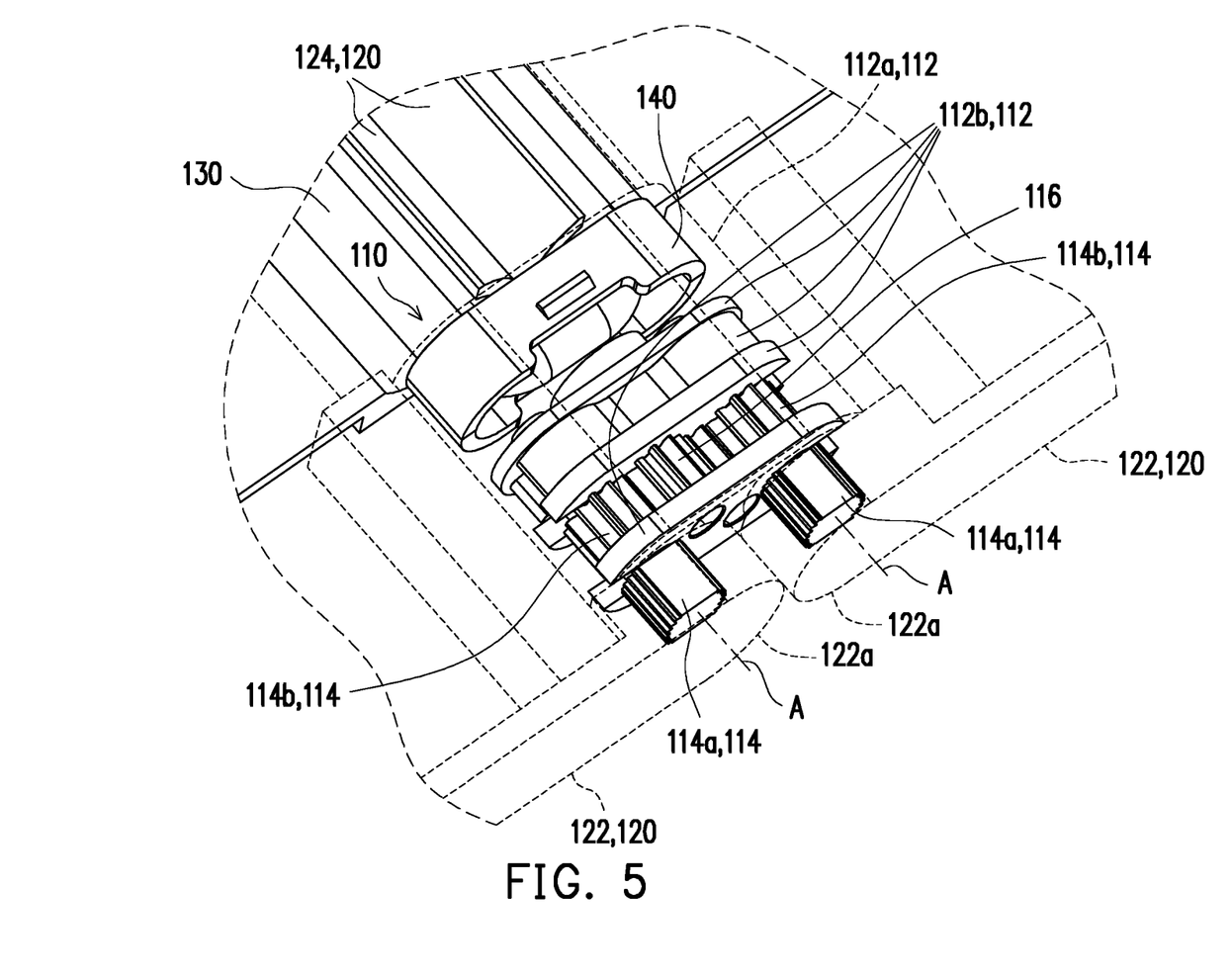
FIG. 5 is an exploded view of part of the electronic device of FIG. 4.
Figure 6:
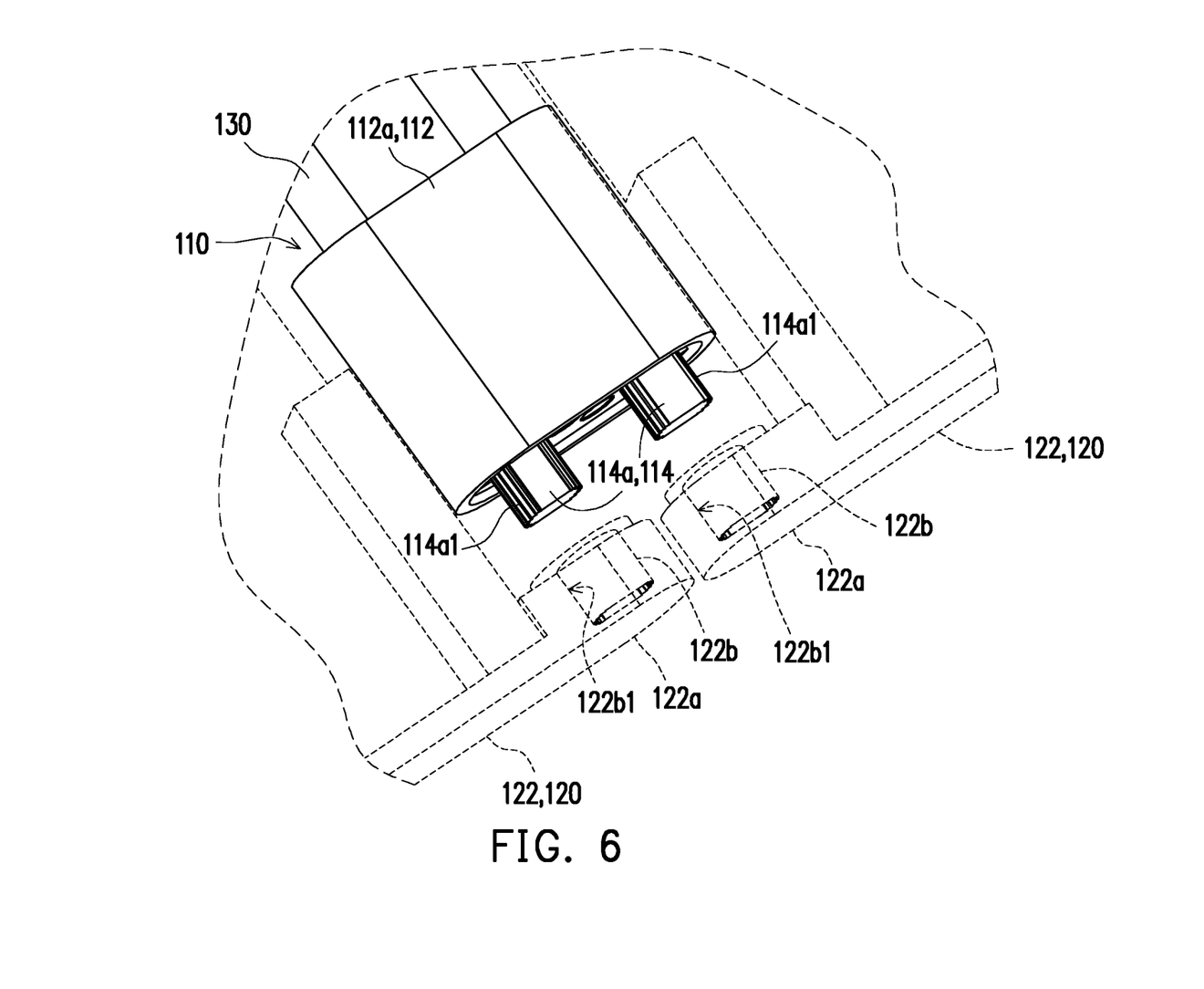
FIG. 6 is an exploded view of part of the electronic device of FIG. 3.
Figure 7:
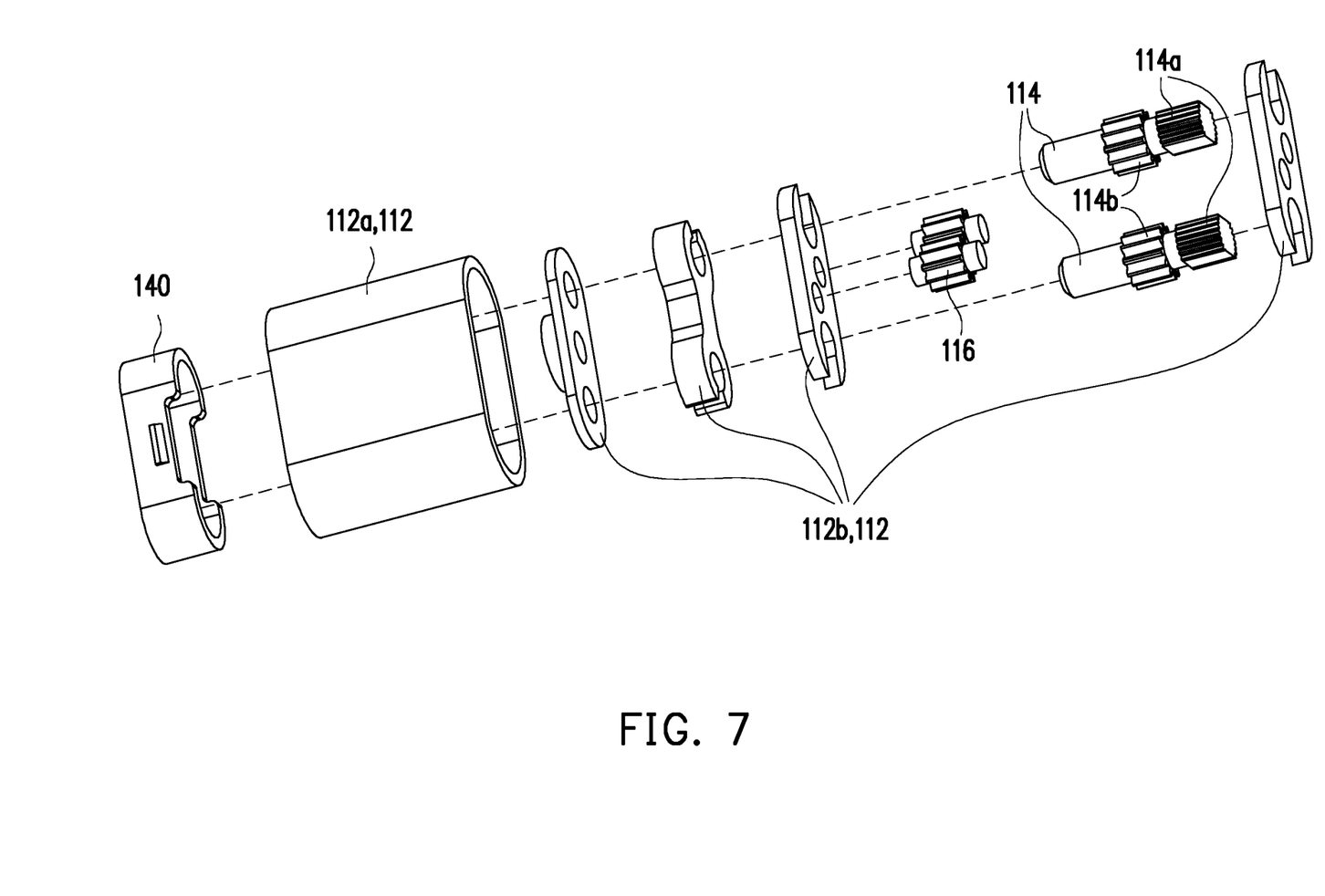
FIG. 7 is an exploded view of the hinge assembly of FIG. 6.

FIG. 4 is a perspective view of part of the electronic device of FIG. 3. FIG. 5 is an exploded view of part of the electronic device of FIG. 4. FIG. 6 is an exploded view of part of the electronic device of FIG. 3. FIG. 7 is an exploded view of the hinge assembly of FIG. 6. Referring to FIG. 4 to FIG. 7, each of the hinge assemblies 110 in the embodiment includes a main body 112 and two shafts 114. The main body 112 may include a hinge cover 112a and a plurality of pivoting elements 112b therein as shown in FIG. 6. One end of each of the shafts 114 is pivotally connected to the pivoting elements 112b of the main body 112, and another end of each of the shafts 114 has an embedded portion 114a. The two bodies 120 respectively correspond to the two shafts 114. A housing 122 of each of the bodies 120 has at least one protrusion 122a (two protrusions are shown in FIG. 1 to FIG. 3), and a depression 122b (shown in FIG. 6) is formed in each of the protrusions 122a. The embedded portion 114a of each of the shafts 114 is embedded into the depression 122b of the corresponding body 120.

Based on the above, each of the shafts 114 of each of the hinge assemblies 110 in the embodiment is directly embedded into the depression 122b of the corresponding body 120 through the embedded portion 114a to establish the connection between the hinge assembly 110 and each of the bodies 120. Accordingly, the hinge assembly 110 is indirectly connected to each of the bodies 120 without the bracket. Therefore, the overall thickness of the electronic device 100 is reduced without the bracket, and the quantity of elements is therefore decreased to reduce the accumulation of assembly skew. In addition, with the configuration, the force applied on the body 120 is not transmitted to the shaft 114 through the bracket, but is directly transmitted from the body 120 to the shaft 114, so the length of the arm between the force point of the body 120 and the shaft 114 is small, which reduces the shaking of the body 120 when a force is applied on the body 120, and the shaking of the body 120 caused by the insufficient rigidity of the bracket is not aggravated when the force is applied on the body 120.

Figure 8:
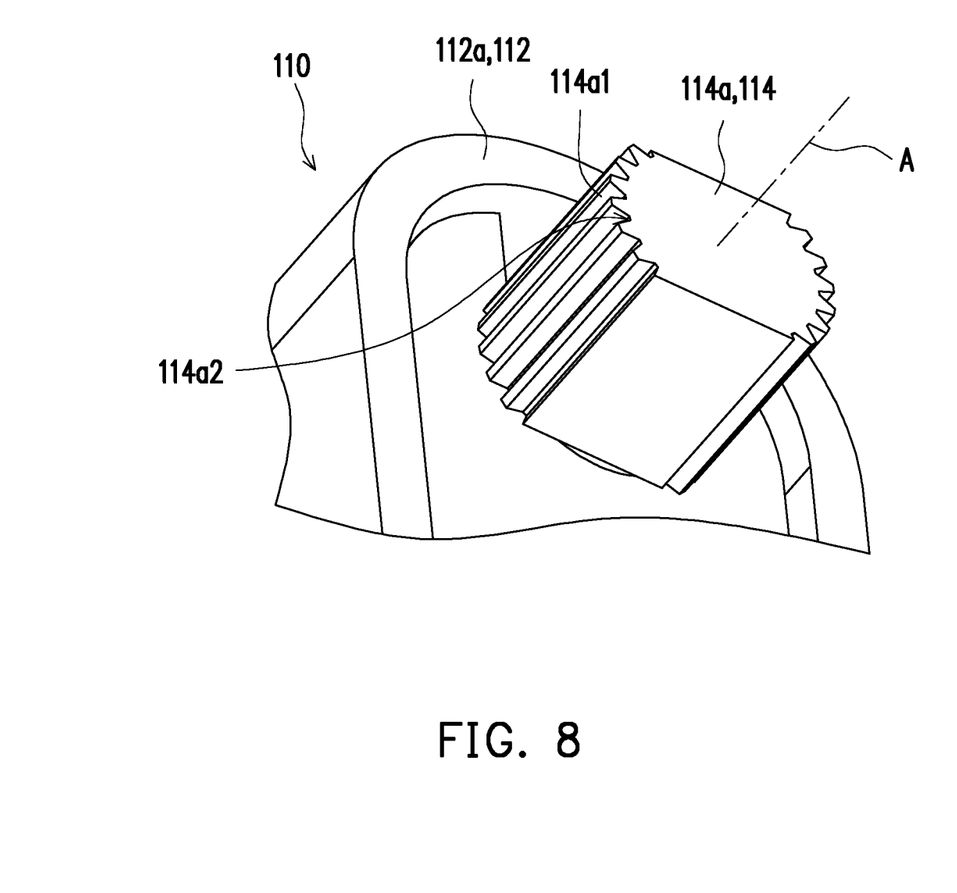
FIG. 8 is an enlarged view of part of the hinge assembly of FIG. 6.

FIG. 8 is an enlarged view of part of the hinge assembly of FIG. 6. Referring to FIG. 8, the embedded portion 114a of each of the shafts 114 in the embodiment has a roughened structure 114a1. The roughened structure 114a1 contacts an inner wall 122b1 of the depression 122b (shown in FIG. 6) to increase the friction between the embedded portion 114a and the inner wall 122b1 of the depression 122b, so that the embedded portion 114a is firmly embedded in the depression 122b. The roughened structure 114a1 is, for example, a texture structure with a concave-convex shape to achieve a roughening effect, but the disclosure is not limited thereto. In other embodiments, the roughening effect may be achieved through manufacturing processes such as etching, turning, sandblasting, and deposition.

More specifically, each of the depressions 122b is, for example, a non-circular hole, and as shown in FIG. 8, each of the embedded portions 114a has a non-circular contour corresponding to the non-circular hole adapted to be embedded into the corresponding depression 122b. In addition, it can be ensured that each of the embedded portions 114a is not rotated unexpectedly in the corresponding depression 122b. In addition, the two shafts 114 are, for example, respectively pivotally connected to the main body 112 along two rotating axes A parallel to each other (shown in FIG. 5 and FIG. 8). Each of the embedded portions 114a is embedded in the depression 122b of the corresponding body 120 along a direction parallel to each of the rotating axes A. Each of the embedded portions 114a has an outer surface 114a2 extending around the corresponding rotating axis A, and the roughened structure 114a1 is formed on part of the outer surface 114a2. In other embodiments, the roughened structure 114al may be formed on the entire each of outer surface 114a2. The disclosure is not limited thereto.

Referring to FIG. 5 and FIG. 7, in the embodiment, each of the hinge assemblies 110 further includes a linkage structure 116. The linkage structure 116 is, for example, a gear set and is connected between gear structures 114b of the two shafts 114, so that the two shafts 114 are rotated synchronously. Under the design method, when the hinge assembly 110 is in operation, the linkage structure 116 of each of the hinge assemblies 110 and the gear structure 114b of the two shafts 114 are adapted to transmit the force. Therefore, provided that the linkage structure 116 and the gear structure 114b have sufficient structural strength, the overall size of the hinge assembly 110 is minimized to increase the area of a display area 120a (shown in FIG. 3) of each of the bodies 120.

Referring to FIG. 2 and FIG. 4, each of the bodies 110 in the embodiment further includes a cover 124. The cover 124 is assembled to the housing 122 instead of being integrally connected to the housing 122, and opposite ends of each of the hinge assemblies 110 are respectively adjacent and connected to the protrusion 122a of the housing 122 and the cover 124. With the design of not integrally connecting the cover 124 to the housing 122, the hinge assembly 110 is assembled before the cover 124 is assembled, so that there is enough space for the hinge assembly 110 to be assembled to the protrusion 122a of the housing 122 along the direction parallel to the rotating axis A, and the assembly difficulty caused by the interference with the cover 124 is prevented.

Figure 9:
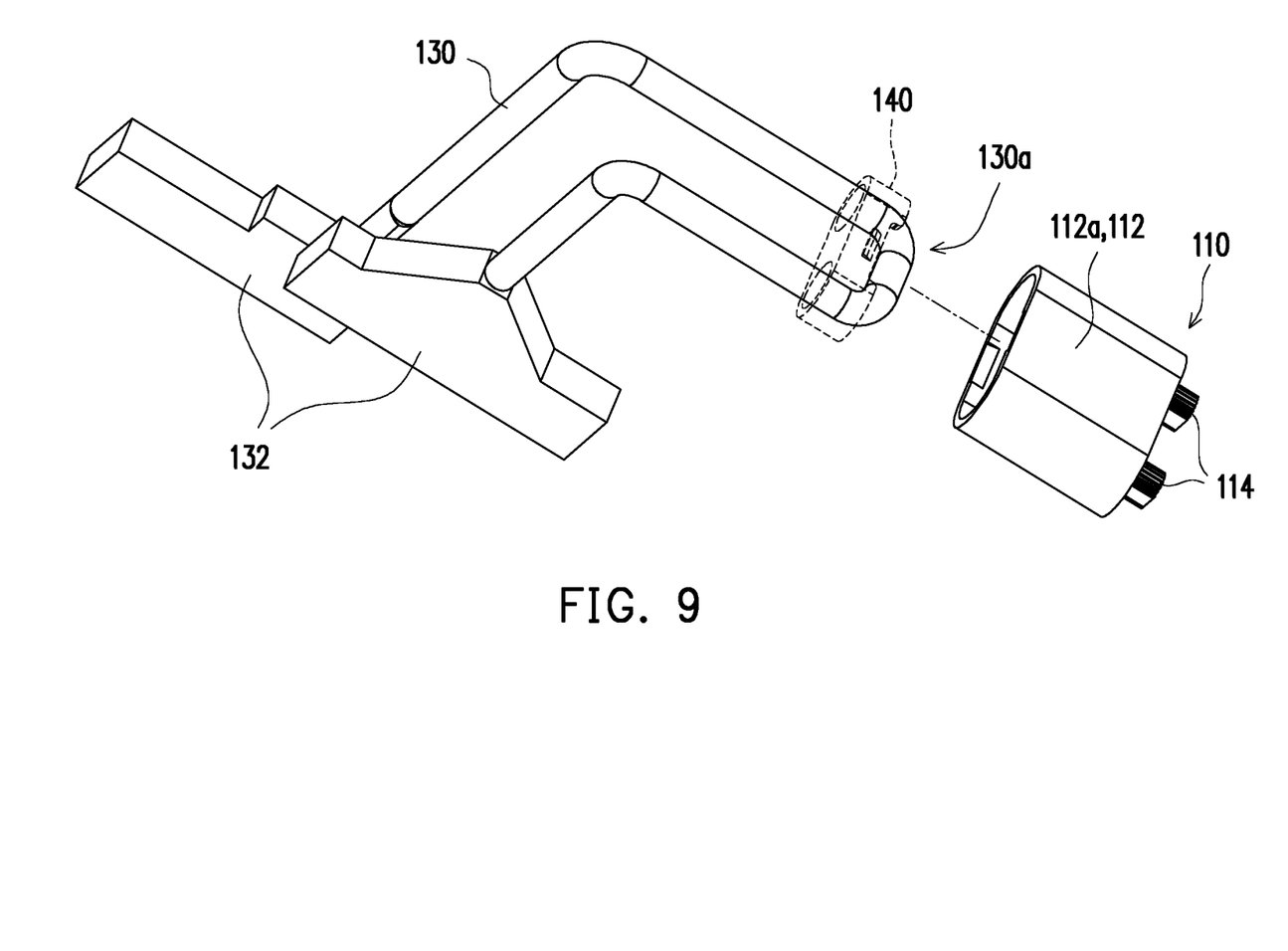
FIG. 9 is an exploded view of the hinge assembly, the transmission wire, and the wire sorting structure of FIG. 5.

FIG. 9 is an exploded view of the hinge assembly, the transmission wire, and the wire sorting structure of FIG. 5. Referring to FIG. 4, FIG. 5, and FIG. 9, the electronic device 100 in the embodiment further includes a transmission wire 130 and a wire sorting structure 140. The transmission wire 130 is respectively connected between the two bodies 120 through two connecting ends 132 of the transmission wire 130, so that signals are transmitted through the two bodies 120 accordingly. Note that the positions of the two connecting ends 132 shown in FIG. 4 are only for illustration, and the two connecting ends 132 are actually connected to the electrical elements of the two bodies 120 respectively.

As shown in FIG. 5 and FIG. 9, a section 130a of the transmission wire 130 passes through the wire sorting structure 140, and the wire sorting structure 140 is disposed in the hinge cover 112a of the main body 112 of the hinge assembly 110, so that the transmission wire 130 is routed between the two bodies 120 by passing through the hinge assembly 110. In the assembly process, the section 130a of the transmission wire 130 passes through the wire sorting structure 140 as shown in FIG. 9, and then the wire sorting structure 140 may be disposed in the hinge cover 112a. The wire sorting structure 140 may be an elastic body made of rubber or plastic, so that it can be easily disposed in the hinge cover 112a due to its elastic deformation ability.

Figure 10:
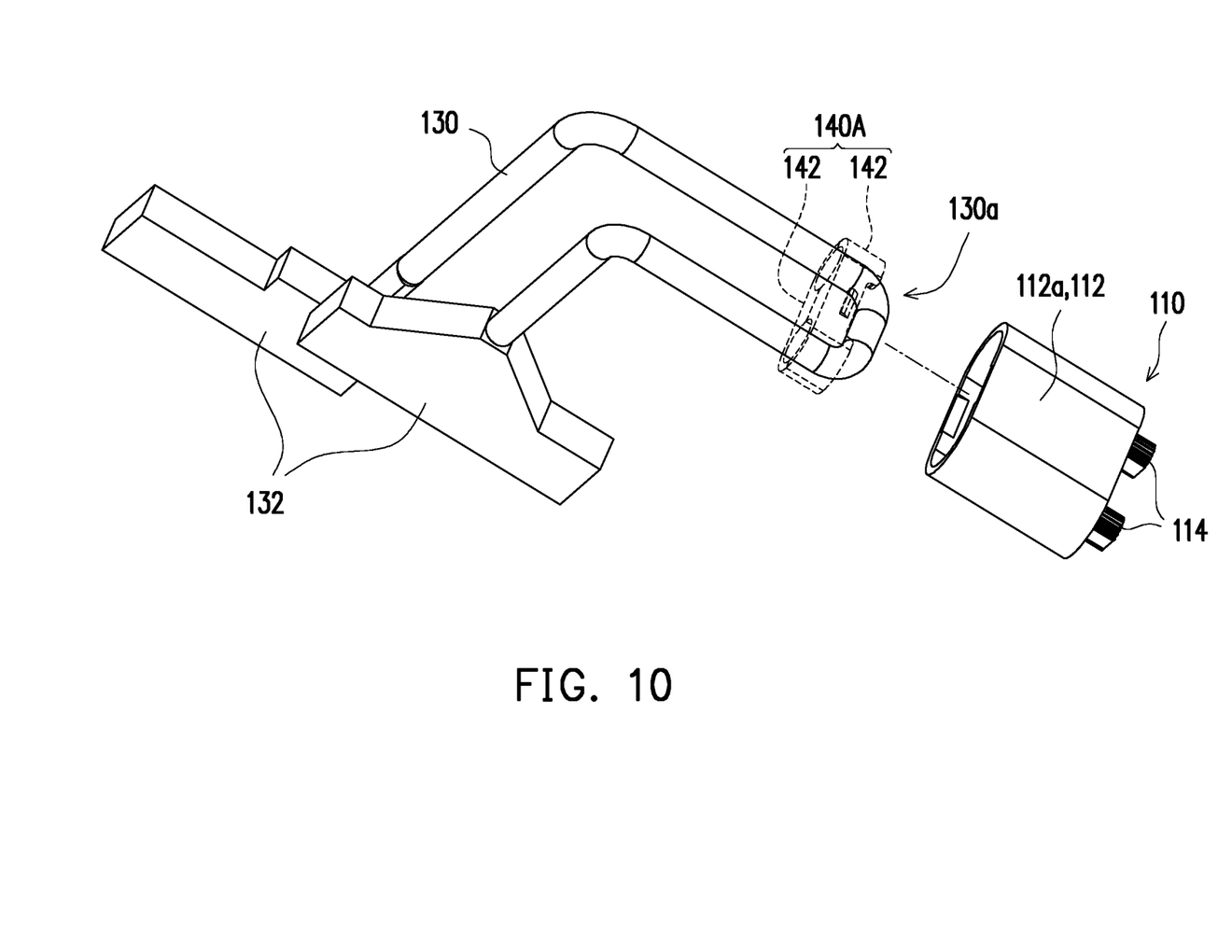
FIG. 10 is an exploded view of a hinge assembly, a transmission wire, and a wire sorting structure according to another embodiment of the disclosure.
Figure 11:
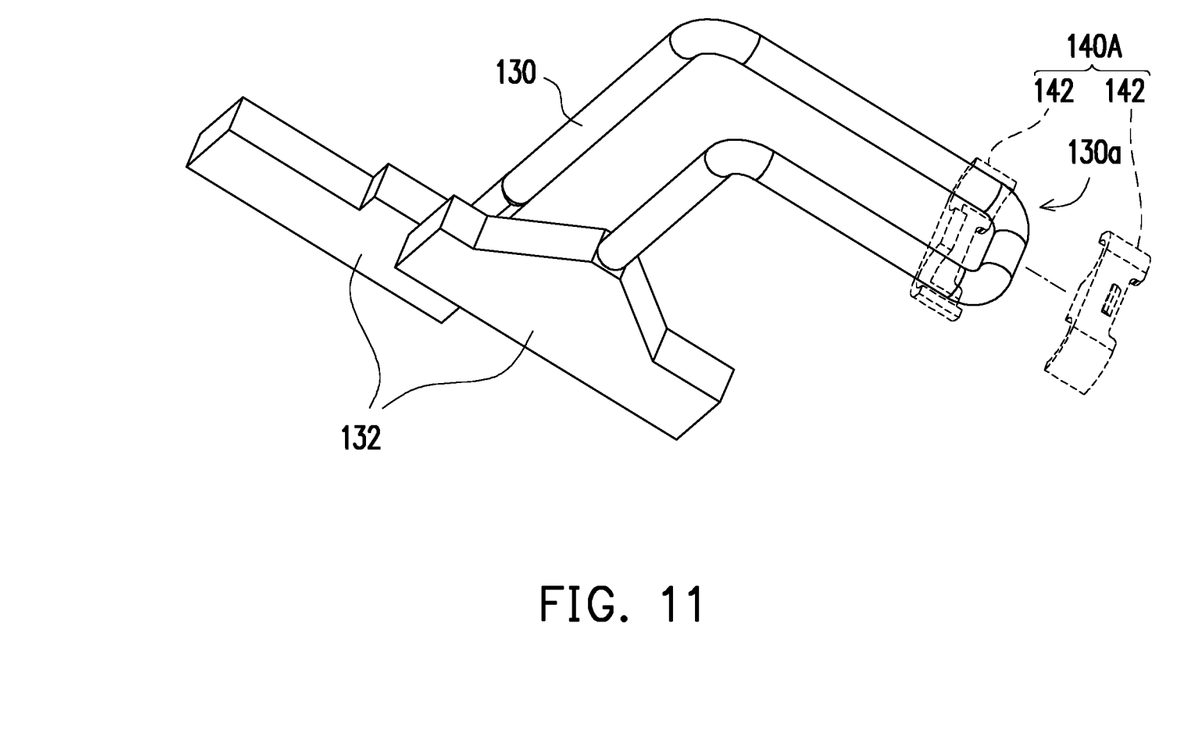
FIG. 11 shows the two assembly parts of the wire sorting structure of FIG. 10 separated from each other.

FIG. 10 is an exploded view of a hinge assembly, a transmission wire, and a wire sorting structure according to another embodiment of the disclosure. FIG. 11 shows the two assembly parts of the wire sorting structure of FIG. 10 separated from each other. The difference between the embodiment shown in FIG. 10 and the embodiment shown in FIG. 9 is that the wire sorting structure 140A of FIG. 10 includes two assembly parts 142 assembled with each other, and the section 130a of the transmission wire 130 is sandwiched between the two assembly parts 142. In the assembly process, the two assembly parts 142 are separated from each other as shown in FIG. 11, so that the section 130a of the transmission wire 130 is placed on one assembly part 142, and then another assembly part 142 is assembled so that the section 130a of the transmission wire 130 becomes the state shown in FIG. 10.

Based on the above, each of the shafts of the hinge assembly of the disclosure has an embedded portion, and the embedded portion is directly embedded into the depression of the corresponding body to establish the connection between the hinge assembly and each of the bodies. Accordingly, the hinge assembly is indirectly connected to each of the bodies without the bracket, so that the overall thickness of the electronic device is reduced by without the bracket, and the quantity of elements is therefore decreased to reduce the accumulation of assembly skew. In addition, with the configuration, the force applied on the body is not transmitted to the shaft through the bracket, but is directly transmitted from the body to the shaft, so the length of the arm between the force point of the body and the shaft is small, which reduces the shaking of the body when a force is applied on the body, and the shaking of the body caused by the insufficient rigidity of the bracket is not aggravated when the force is applied on the body. In addition, the embedded portion of each of the shafts has a roughened structure to increase the friction between the embedded portion and the inner wall of the depression, so that the embedded portion is firmly embedded into the depression.

What is claimed is:

1. An electronic device, comprising:
   at least one hinge assembly comprising a main body and two shafts, wherein one end of each of the shafts is pivotally connected to the main body, another end of each of the shafts comprises an embedded portion, and the embedded portion comprises a roughened structure thereon; and
   two bodies corresponding to the two shafts respectively, wherein each of the bodies comprises at least one depression, and the embedded portion of each of the shafts is embedded in the at least one depression of the corresponding body and fixed on an inner wall of the at least one depression through the roughened structure, wherein an entire surface of the inner wall is a smooth surface surrounding the embedded portion.

2. The electronic device according to claim 1, wherein each of the bodies comprises a housing, and the at least one depression is formed in the housing.

3. The electronic device according to claim 2, wherein the housing comprises at least one protrusion, and the at least one depression is formed in the at least one protrusion.

4. The electronic device according to claim 3, wherein each of the bodies further comprises a cover, wherein the cover is assembled to the housing, and opposite ends of the hinge assembly are respectively adjacent and connected to the protrusion and the cover.

5. The electronic device according to claim 1, wherein the at least one depression is a non-circular hole, and the embedded portion comprises a non-circular contour corresponding to the non-circular hole.

6. The electronic device according to claim 1, wherein the two shafts are respectively pivotally connected to the main body along two rotating axes parallel to each other, and the embedded portion is embedded in the at least one depression of the corresponding body along a direction parallel to each of the rotating axes.

7. The electronic device according to claim 1, wherein the two shafts are respectively pivotally connected to the main body along two rotating axes parallel to each other, the embedded portion comprises an outer surface extending around the corresponding rotating axis, and the roughened structure is formed on at least part of the outer surface.

8. The electronic device according to claim 1, wherein the at least one hinge assembly further comprises a linkage structure, and the linkage structure is connected between the two shafts.

9. The electronic device according to claim 8, wherein the linkage structure is a gear set.

10. The electronic device according to claim 1, further comprising a transmission wire and a wire sorting structure, wherein the transmission wire is connected between the two bodies, a section of the transmission wire passes through the wire sorting structure, and the wire sorting structure is disposed in the main body of the at least one hinge assembly.

11. The electronic device according to claim 10, wherein the wire sorting structure is an elastic body.

12. The electronic device according to claim 10, wherein the wire sorting structure comprises two assembly parts assembled with each other, and the section of the transmission wire is sandwiched between the two assembly parts.

13. The electronic device according to claim 1, wherein the roughened structure is a texture structure.

* * * * *